UNITED STATES PATENT OFFICE.

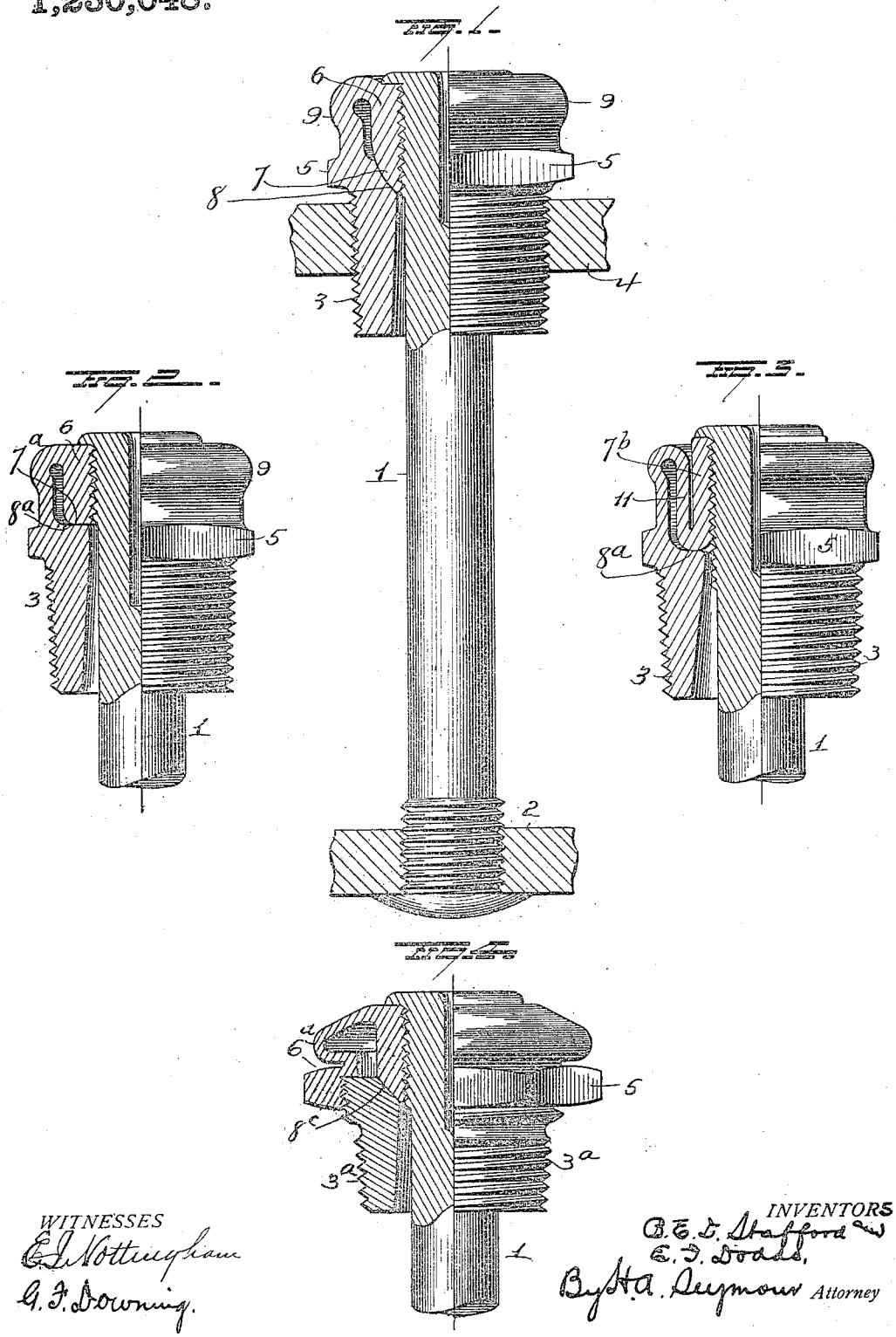
B. E. D. STAFFORD & E. I. DODDS.
STAY BOLT FOR BOILERS.
APPLICATION FILED FEB. 27, 1915.
1,230,048.
Patented June 12, 1917.

BENJAMIN E. D. STAFFORD AND ETHAN I. DODDS, OF PITTSBURGH, PENNSYLVANIA, ASSIGNORS TO FLANNERY BOLT COMPANY, OF PITTSBURGH, PENNSYLVANIA.

STAY-BOLT FOR BOILERS.

1,230,048.   Specification of Letters Patent.   Patented June 12, 1917.

Application filed February 27, 1915. Serial No. 11,080.

*To all whom it may concern:*

Be it known that we, BENJAMIN E. D. STAFFORD and ETHAN I. DODDS, citizens of the United States, and residents of Pittsburgh, in the county of Allegheny and State of Pennsylvania, have invented certain new and useful Improvements in Stay-Bolts for Boilers; and we do hereby declare the following to be a full, clear, and exact description of the invention, such as will enable others skilled in the art to which it appertains to make and use the same.

Our invention relates to an improvement in stay bolts for boilers, the object being to provide a simple device for attaching the bolt to the outer sheet of the boiler, and which will permit the bolt to yield longitudinally and laterally, without unduly straining either of the sheets, and which will insure a tight flexible joint under any and all conditions.

Our invention consists in a sleeve externally threaded and provided with an internal seat, and a yielding member having internal threads for the attachment of the stay bolt and a shoulder to rest on said seat.

Our invention further consists in an integral sleeve one end of which is threaded externally, and the other end threaded internally, the sleeve being provided with an internal seat for supporting the internally threaded end, the portion of the sleeve intermediate the threaded ends being yielding, and a bolt screwed to the internally threaded end of the sleeve.

Our invention further consists in the parts and combinations of parts as will be more fully explained and pointed out in the claims.

In the accompanying drawings Figure 1 is a view partly in section and partly in elevation of one embodiment of my invention and Figs. 2, 3 and 4 are similar views of modified forms.

1 represents a rigid bolt having threaded ends, one of which is secured directly to the inner sheet 2 of the fire box or boiler and the other to the sleeve or bushing 3 screwed into the outer sheet. This sleeve or bushing 3 is provided with external threads for its attachment to the outer sheet 4; with an angular surface 5 to be engaged by a wrench or other tool employed for attaching it to the sheet 4, and at its outer end 6 with a bore internally threaded to receive the outer end of the bolt 1.

The outer end 6 of the sleeve projects inwardly into said sleeve, and is provided, in Fig. 1 with a rounded end 7 which is normally seated on the curved seat 8 formed within the sleeve or bushing 3. The portion 9 of the sleeve between the internally and externally threaded parts is of less thickness than the externally threaded part, and is more or less curved or shaped so as to act as a spring and thus permit of the necessary lateral or rocking and longitudinal movements of the bolt 1 which, as shown, is secured to the internally threaded portion of the sleeve, and may be locked therein by upsetting the end of the bolt.

Normally the rounded end 7 of the internally threaded portion rests on the curved seat 8 in the sleeve proper and takes all the expansive stresses to which the bolt is subjected, the spring portion 9 of the sleeve sustaining the bolt only during a collapsing movement of the sheets, and compensating for expansion of the bolt.

The construction shown in Fig. 2 is substantially identical with that shown in Fig. 1, except that the seat $8^a$ is flat instead of curved, and the end $7^a$ of the internally threaded section 6 is widened out and but slightly curved so as to have a free rocking movement on the seat $8^a$.

In Fig. 3 the outer end of the sleeve is turned inwardly as at 11 and then outwardly as at $7^b$, the shoulder or bend at the junction of the inwardly and outwardly bent portions resting on the seat or shoulder $8^a$ within the sleeve. This construction, by reason of the increase in the length of the spring portion of the sleeve, provides for greater flexibility and freer movement of the internally threaded portion of the sleeve to which the outer end of the bolt is secured.

In the construction shown in Fig. 4 the sleeve is made of two parts $3^a$ and $6^a$. The main or body portion $3^a$ of the sleeve is externally threaded for its attachment to a boiler sheet and also externally threaded for the attachment of the outer part $6^a$, the free end of the internally threaded portion of the part $6^a$ resting on the seat $8^c$ which may be inclined as shown. In other respects it is substantially identical with the construction previously described.

The sleeves so constructed are heat treated and cooled in oil so that the spring or yielding sections thereof will retain their elasticity when exposed to the high temperatures to which they are subjected in use.

By increasing the number of folds, or increasing the length of the spring section, sufficient elasticity will be provided to absorb or take care of all necessary longitudinal and lateral and vibratory movements to which the bolt may be subjected due to the expansion of the bolt itself or to longitudinal and lateral movements of the bolt due to outward or lateral movement or buckling action of the inner sheet, and provides in effect for universal movement of the outer end of the bolt. The construction also insures a tight flexible joint under any and all conditions.

Having fully described our invention what we claim as new and desire to secure by Letters-Patent, is:—

1. In stay bolt construction, a sleeve externally threaded and provided with an internal seat, and a yielding member projecting outwardly from the outer end of said sleeve, and provided with a shoulder to engage the seat within the sleeve, the said yielding member adapted to support the outer end of the stay bolt.

2. In stay bolt construction, a sleeve externally threaded and provided with an internal seat, and a yielding member projecting outwardly from the outer end of said sleeve, and also projecting inwardly into the sleeve and provided with a shoulder to rest on the seat in said sleeve, and also provided with means for the attachment of the stay bolt.

3. In stay bolt construction, a two part sleeve, one part of which is externally threaded and provided at its outer end with a seat, and the other part made to yield and secured by threads to the outer end of first mentioned part, the said yielding part having a shoulder to rest on the seat in the externally threaded part and also provided with internal thread for the attachment of a stay bolt.

In testimony whereof, we have signed this specification in the presence of two subscribing witnesses.

BENJAMIN E. D. STAFFORD.
ETHAN I. DODDS.

Witnesses:
  EDWIN S. RYCE,
  F. H. ALLISON.